US011866376B2

(12) United States Patent
Lashmore et al.

(10) Patent No.: US 11,866,376 B2
(45) Date of Patent: Jan. 9, 2024

(54) CONTINUOUS BORON NITRIDE NANOTUBE YARNS AND METHODS OF PRODUCTION

(71) Applicant: University of New Hampshire, Durham, NH (US)

(72) Inventors: David S. Lashmore, Lebanon, NH (US); Tyler Bennett, Durham, NH (US)

(73) Assignee: University of New Hampshire, Durham, NH (US)

( * ) Notice: Subject to any disclaimer, the term of this patent is extended or adjusted under 35 U.S.C. 154(b) by 960 days.

(21) Appl. No.: 16/666,580

(22) Filed: Oct. 29, 2019

(65) Prior Publication Data

US 2020/0255985 A1 Aug. 13, 2020

Related U.S. Application Data

(63) Continuation of application No. 14/447,433, filed on Jul. 30, 2014, now Pat. No. 10,458,049.

(60) Provisional application No. 61/860,151, filed on Jul. 30, 2013.

(51) Int. Cl.
| | |
|---|---|
| C04B 35/00 | (2006.01) |
| C04B 35/80 | (2006.01) |
| C04B 35/622 | (2006.01) |
| D02G 3/16 | (2006.01) |
| C04B 35/5831 | (2006.01) |
| C01B 21/064 | (2006.01) |
| D02G 3/02 | (2006.01) |
| D02G 3/44 | (2006.01) |
| F41H 1/02 | (2006.01) |
| F41H 5/02 | (2006.01) |

(52) U.S. Cl.
CPC .......... *C04B 35/80* (2013.01); *C01B 21/0641* (2013.01); *C01B 21/0646* (2013.01); *C01B 21/0648* (2013.01); *C04B 35/5831* (2013.01); *C04B 35/6229* (2013.01); *D02G 3/02* (2013.01); *D02G 3/16* (2013.01); *D02G 3/442* (2013.01); *F41H 1/02* (2013.01); *F41H 5/02* (2013.01); *C01P 2004/04* (2013.01); *C01P 2004/13* (2013.01); *C01P 2004/136* (2013.01); *C01P 2004/54* (2013.01); *C04B 2235/524* (2013.01); *C04B 2235/526* (2013.01); *C04B 2235/5264* (2013.01); *C04B 2235/5284* (2013.01); *D10B 2101/14* (2013.01); *D10B 2507/00* (2013.01)

(58) Field of Classification Search
CPC . C04B 35/80; C04B 35/5831; C04B 35/6229; C01B 21/0641; C01B 21/0646; C01B 21/0648; C01P 2004/13
USPC ....................................................... 423/284
See application file for complete search history.

(56) References Cited

U.S. PATENT DOCUMENTS

| | | | |
|---|---|---|---|
| 7,611,579 B2 | 11/2009 | Lashmore et al. | |
| 10,458,049 B2 | 10/2019 | Lashmore et al. | |
| 2008/0170982 A1 | 7/2008 | Zhang et al. | |
| 2010/0099319 A1 | 4/2010 | Lashmore et al. | |
| 2010/0192535 A1 | 8/2010 | Smith et al. | |
| 2012/0175242 A1* | 7/2012 | Smith | C01B 21/0641 422/186 |
| 2012/0186742 A1 | 7/2012 | Kang et al. | |
| 2015/0033937 A1 | 2/2015 | Lashmore et al. | |
| 2015/0376069 A1 | 12/2015 | Kang et al. | |

OTHER PUBLICATIONS

Nigues et al., "Ultrahigh interlayer friction in multiwalled boron nitride nanotubes", Nature Materials, Letters, Published Online, www.nature.com/naturematerials, Jun. 1, 2004, DOI:P 10.1038/NMAT3985, 6 pages.
Shin et al., "Interlayer locking and atomic-scale friction in commensurate small-diameter boron nitride nanotubes", Published by the American Physical Society, Published Feb. 6, 2017, Physical Review DOI: 10.1103/PhysRevB.95.085406, 5 pages.
International Search Report received in PCT Application No. PCT/US2014/048949, dated Nov. 24, 2014, 12 pages.
Kim et al., "Double-Walled Boron Nitride Nanotubes Grown by Floating Catalyst Chemical Vapor Disposition", American Chemical Society, Nano Letters, vol. 8, No. 10, Sep. 13, 2008, pp. 3298-3302.
Pinilla et al., "A Novel Rotary Reactor Configuration for Simultaneous Production of Hydrogen and Carbon Nanofibers". Science Direct, International Journal of Hydrogen Energy vol. 34, Issue 19, Oct. 2009, pp. 8106-8022.
Smith et al., "Very Long Single- and a Few-Walled Boron Nitride Nanotubes Via the Pressurized Vapor/Condensor Method", IOP Publishing Ltd., Nanotechnology, vol. 20, No. 50, 2009, 6 pages.

(Continued)

*Primary Examiner* — Steven J Bos
(74) *Attorney, Agent, or Firm* — Finch & Maloney PLLC

(57) ABSTRACT

A method and apparatus for producing boron nitride nanotubes and continuous boron nitride nanotube yarn or tapes is provided. The apparatus includes rotating reaction tubes that allow for continuous chemical vapor deposition of boron nitride nanotubes. The rotation of the reaction tubes allows the boron nitride nanotubes to be spun into yarns or made into tapes, without post process or external rotation or spinning of the gathered nanotubes. Boron nitride nanotube yarns or tapes of great length can be produced as a result, thereby providing industry with a readily useable format for this type of material. Dopants such as carbon can be added to engineer the band gap of the nanotubes. Catalysts may be formed outside or inside the reactor.

20 Claims, 5 Drawing Sheets

(56) References Cited

OTHER PUBLICATIONS

"BNNT Technical Data Sheet," BNNT: Pioneering Revolutionary Materials. BNNT, LLC, 2014. Web <http://www.bnnt.com/images/tech_data/documents/BNNT_P1_Beta_Tech_Data_1.2.pdf> 2014. 4 pages.

Dolbec, Richard, "Boron Nitride Nanotubes: Properties, Synthesis and Applications," Web <http://www/sigmaaldrich.com/technical-documents/articles/technology-spotlights/boron-nitrde-nanotubes.html.> 2017. 5 pages.

Saville, B.P., "Physical Testing of Textiles—4.2 Twist," Woodhead Publishing. Web <https://app.knovel.com/hotlink/pdf/id:kt003HTCB3/physical-testing-textiles/twist> 1999. 38 pages.

* cited by examiner

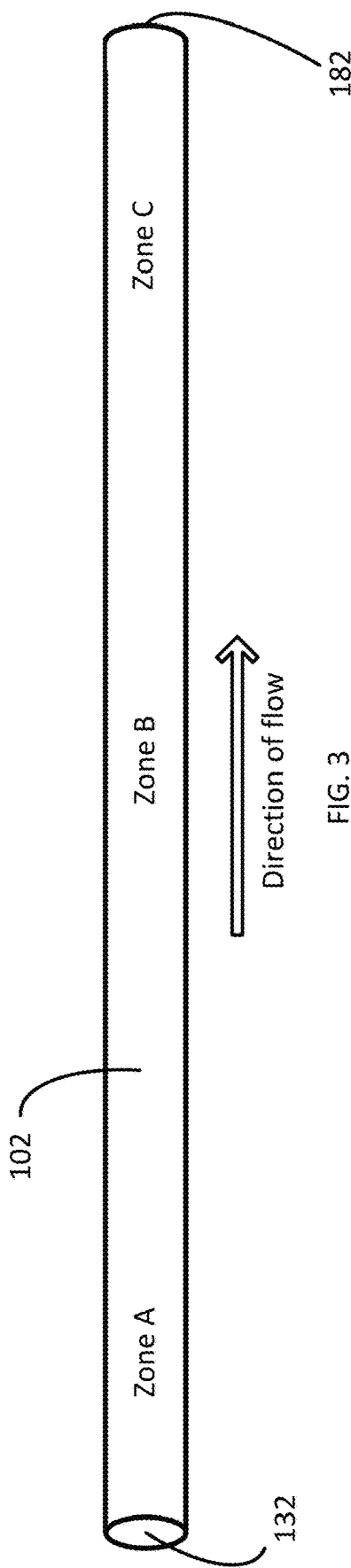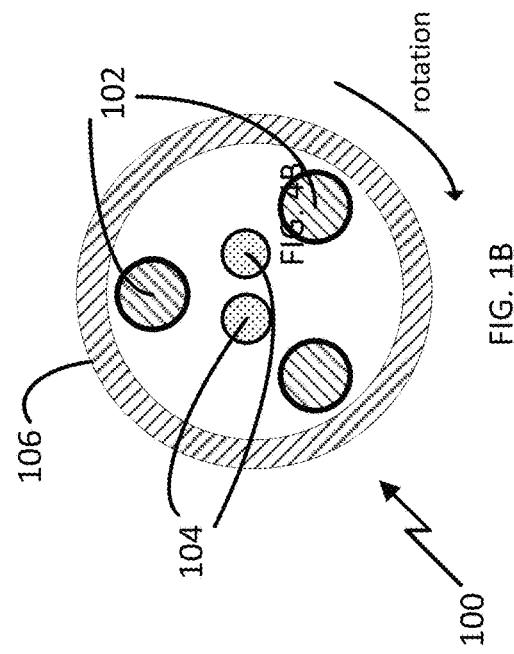

CONTINUOUS BORON NITRIDE NANOTUBE YARNS AND METHODS OF PRODUCTION

RELATED APPLICATIONS

This application is a continuation of U.S. patent application Ser. No. 14/447,433, filed on Jul. 30, 2014, which claims benefit of U.S. Provisional Application 61/860,151, filed Jul. 30, 2013, titled CONTINUOUS BORON NITRIDE NANOTUBE YARNS AND METHOD OF PRODUCTION, the contents of which are hereby incorporated by reference herein.

STATEMENT REGARDING FEDERALLY SPONSORED RESEARCH

This invention was made in part with government support under contract DII NRO 000-14-C-0071 awarded by the National Reconnaissance Office. The United States government has certain rights in the invention.

BACKGROUND

1. Field of Invention

The invention relates to boron nitride nanotubes and, in particular, to continuous boron nitride nanotube yarns and tapes.

2. Discussion of Related Art

Boron nitride shows promise for a variety of applications due to its unique structural, electrical and chemical characteristics. Boron nitride nanotubes (BNNT) are of particular interest due to their excellent mechanical properties, their insulative character and radiation shielding characteristics. The synthesis of continuous boron nitride nanotube yarns and tapes would enable these industrially useful material formats to be produced commercially for the first time.

SUMMARY

In one aspect a continuous boron nitride nanotube yarn having a length greater than 15 cm is provided, the yarn comprising a plurality of boron-nitride nanotubes including a first boron-nitride nanotube and a second boron-nitride nanotube, the first and second boron-nitride nanotubes each have an aspect ratio of greater than 10,000:1 and each forming a helix around a common axis wherein the first and second boron-nitride nanotubes each have a pitch angle between 5° and 50°. The yarn may have a pitch angle between 5° and 45° and the nanotubes may each have an aspect ratio of greater than 100,000:1. The yarns may comprise a portion of a composite, armor such as body armor and composites including boron nitride composites. In some embodiments, the composites can be used at high temperatures, such as greater than 500° C. and up to 900° C. The boron nitride yarn may have a tailored band gap that is engineered by adding a dopant such as carbon into the BN structure during the growth process or after the growth process by, for example, by exposure to an appropriate superacid.

In another aspect a method of producing boron-nitride nanotube continuous yarn is provided, the method comprises feeding a boron containing gas species, a nitrogen containing gas species, a carrier gas and a catalyst or a catalyst precursor into a plurality of reaction tubes, each reaction tube having a first portion at a first temperature and a second portion at a second temperature greater than the first temperature, rotating the reaction tubes around a common axis while the boron, nitrogen and catalyst flow from the first portion to the second portion of each of the plurality of reaction tubes, growing boron-nitride nanotubes towards the end of each of the plurality of rotating reaction tubes, and combining the boron-nitride nanotubes into a yarn as the nanotubes exit the rotating reaction tubes. The method may further comprise growing boron nitride nanotubes in a furnace reactor downstream of the end of the rotating reaction tubes. Sources for the boron and nitrogen can be from compounds that contain both; such as, boron ammonia complex, ($H_3N$—$BH_3$), borazine $(BH)_3(NH)_3$.), dimethylamine borane ($C_2H_{10}BN$). Alternatively the nitrogen and the boron can be introduced separately where the nitrogen containing species which may be selected; for example, from nitrogen, ammonia, $NaNH_4$ and $NR_4Cl$. The boron containing species may be selected, for example, from B, $B_2H_6$, $BH_2NH_3$, BN, $B_2O_2$, $NaNH_4$, $BNH_6$, $H_3BO_3$, $B_3N_3H_6$ and $B_{10}H_{14}$. The carrier gas may be helium, nitrogen, argon or ammonia. The catalyst or catalyst precursor may include sulfur such as sulfur containing organic compounds including thiophene.

The catalyst or catalyst precursor may include a transition metal and may be an organo-metallic compound such as ferrocene or iron pentacarbonyl. Catalysts can be created in situ using thermal decomposition of a transition metal compound as described above, or can be created externally and injected along with the boron and nitrogen compound dissolved or suspended in a solvent. An example of an appropriate solvent is methanol, an alternative solvent useful for growth of carbon nanotubes is ethanol. The catalyst can be formed outside of the reaction tubes and can be formed in an external liquid system. The catalyst can be formed by reducing a metallic cation to a metal or metal alloy and may be introduced to the reaction tubes as a particle. The method of catalyst production can include combining a catalyst precursor with a reducing agent. The reducing agent can be selected from at least one of sodium borohydride, dimethylamine borane, hydrazine or sodium hypophosphate. The catalyst may be essentially free of carbon, may comprise a transition metal, may comprise two or more metals and may comprise iron and at least one of copper and cobalt. The catalyst can be an alloy of iron and at least one other metal. The catalyst precursor can be combined with a reducing agent at a temperature below 25° C., less than or equal to 10° C. The catalyst precursor can be added to a solution of the reducing agent wherein the reducing agent solution is at a temperature of less than or equal to 50° C. and preferably less than 10° C. The catalyst may be a metallic particle or a metallic alloy particle having an average size of less than or equal to 30 nm.

The yarn formation method may further include gathering boron nitride nanotubes exiting the rotating reaction tubes, holding the gathered boron nitride nanotubes together, and allowing the rotating reaction tubes to spin the gas and form the boron nitride nanotubes into a yarn. Without twisting, this material can be formed into a tape. In some embodiments the method includes adding a dopant to the carrier gas and in some cases at least one of the boron containing gas species, the nitrogen containing gas species, the catalyst and the catalyst precursor is sublimed to reach the vapor phase. In some embodiments, a nebulizer or atomizer is not required. Nitrogen and boron may be provided in approximately equal molar quantities and production rates may be greater than 1 g/hr of boron nitride nanotubes for each of the plurality of reaction tubes. The carrier gas may be, for example, helium, argon or hydrogen. The reaction tubes can be rotated at a speed of at least 1 rpm about a common axis of rotation that is substantially parallel to the long axis of the reaction tubes. The yarn pitch angle is related to the rotation speed and the gas velocity.

In another aspect, an apparatus for producing boron-nitride nanotubes is provided, the apparatus comprising a mixing zone configured to receive catalyst, nitrogen and boron sources; a plurality of reaction tubes fluidly connected to the mixing zone, the reaction tubes rotationally mounted around a common axis, and at least one heater constructed and arranged to heat the plurality of reaction tubes. The apparatus can be fluidly connected to a catalyst source, a nitrogen source, a boron source and a source of a carrier gas. The heater may be positioned centrally between the plurality of reaction tubes and the mixing zone may also be heated. The apparatus can include a rotating assembly and a stationary assembly and wherein there is a gastight seal between the rotating assembly and the stationary assembly. The apparatus may include one or more sublimers wherein the sublimers are in fluid communication with, and upstream of, the mixing zone. The rotating assembly can be supported by one or more rotational bearings such as a sealed ceramic bearing. The apparatus may be controlled by a microprocessor, the microprocessor controlling one or more of the rotational speed, the carrier gas flow rate, the temperature of a sublimer, the temperature of a reaction tube or the speed of a take up spool. In response to a change in process parameters, the microprocessor can alter at least one of the rotational speed, the carrier gas flow rate, the temperature of a sublimer, the temperature of a reaction tubes or the speed of a take up spool. The plurality of reaction tubes may be subjected to a temperature gradient and the temperature gradient in the plurality of reaction tubes increases in the direction of flow.

The subject matter of this application may involve, in some cases, interrelated products, alternative solutions to a particular problem, and/or a plurality of different uses of a single system or article.

BRIEF DESCRIPTION OF THE DRAWINGS

FIG. 1B is an axial cross section of a portion of the apparatus of FIG. 1A;

FIG. 3 provides a schematic plan view of one of the reaction tubes of the apparatus shown in FIG. 1A;

DETAILED DESCRIPTION

Figure 1A:
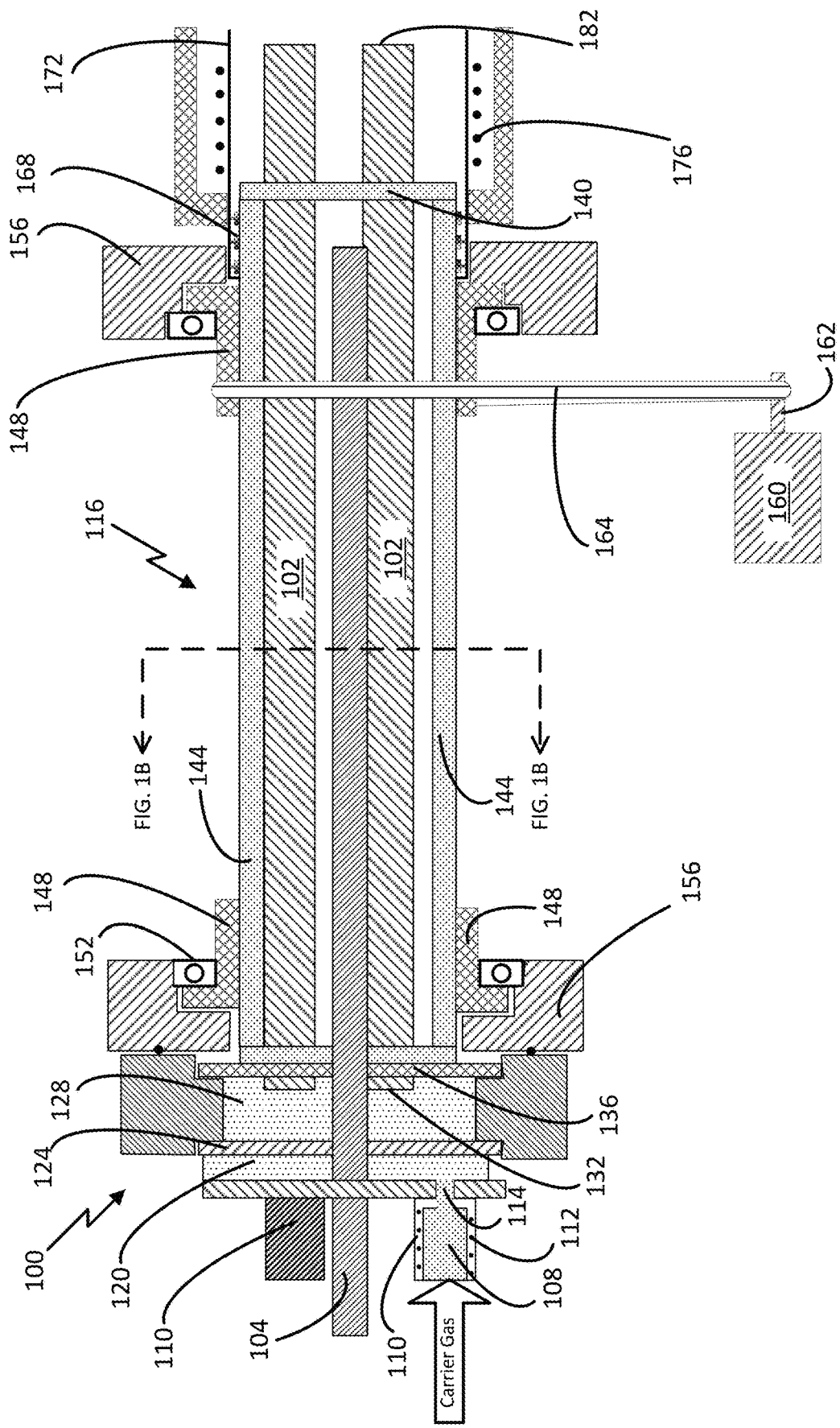
FIG. 1A is a schematic longitudinal cross-section of one embodiment of an apparatus for producing boron nitride nanotubes.

In one set of embodiments, a system and method for producing continuous boron nitride nanotube yarns at a high rate is described. The method can include a chemical vapor deposition (CVD) technique that uses gas phase pyrolysis and an in situ formed catalyst. Sources of boron and nitrogen as well as a catalyst precursor can be sublimed or nebulized and subsequently fed to a set of rotating reaction tubes (rotating tubes) where the catalysts are formed and the reaction to form BNNTs is initiated. The temperature of the rotating tubes increases along the length of the rotating tubes, the catalyst is formed in situ and boron and nitrogen molecules are adsorbed onto the catalyst surface. A plurality of individual reactor tubes containing boron nitride precursors in a gaseous state can be rotated around an axis. Thus, the twist in the BNNT yarn can be formed as a result of the rotation of the gases before the BNNTs are actually formed. Rotation can be provided upstream of the point of formation rather than by providing rotation downstream of the point of formation. Boron nitride geodesic structures or buckyspheres are formed and grow out as BNNTs. After exiting, the nanotubes from each rotating tube are joined and spun together as a result of the rotation of each tube about a central axis. The initial reaction continues but at much higher rates in a high temperature furnace where the exiting cloud of BNNTs are caused to rotate and form the desired twist angle required by a yarn. In this manner, continuous BNNT yarns can be formed at very high speed and in a continuous manner.

Boron nitride nanotubes are similar in structure to carbon nanotubes in that they are formed of multiple six-member hexagonal rings that form graphene-like structures that self-assemble into tubes. Both BNNTs and CNTs can be single-walled, double-walled or multi-walled and are hollow in the center. However, significant differences between the two types of nanotubes result in some very different properties. While CNTs are composed entirely of carbon, BNNTs are composed of alternating atoms of boron and nitrogen. Electrical properties are different as BNNTs possess a wide band gap, about 5.0 eV, and as a result form excellent electrical insulators. This band gap may be tuned, however, by an electric field which may enable the BNNTs to take on semiconductor or even metallic properties. Doping with carbon atoms may also result in BNNTs to be semiconductive or metallically conductive, that is, the band gap changes with carbon content. BNNTs exhibit many properties that make them candidates for a variety of structural, medical and aerospace applications. For instance, BNNTs have exceptional tensile strength, on the order of CNTs. However, BNNTs are thermally stable at much higher temperatures. For example, BNNTs may be stable at up to 800° C., even in the presence of air, while CNTs rarely survive above 600° C. in air. The presence of boron atoms also means that BNNTs hold great potential as neutron absorbers and when coated with polyethylene (hydrogen) will also efficiently absorb high energy electrons. Further, BNNTs exhibit a large piezoelectric effect suggesting applications as sensors, power generators, and applications for structural health monitoring of aircraft, bridges and, potentially, thermoelectric devices.

Boron nitride nanotube yarns are significantly more difficult to synthesize than are CNTs for a number of reasons. A number of different growth techniques have been used to make small amounts of BNNTs. These methods include arc-discharge, laser vaporization, boron nitride substitution from CNT templates, chemical vapor deposition (CVD) techniques, plasma enhanced CVD, combustion of iron nitride and boron powders, templating polymer thermolysis and even ball milling. These methods have not been successful at continuous growth of BNNT yarn, sheet or continuous tape and it is believed that lengths of individual nanotubes have not exceeded about a millimeter and are usually very much smaller.

In one set of embodiments described herein, continuous BNNTs are produced using gas phase pyrolysis and a catalyst. The catalyst can be unanchored and can flow with a carrier gas. As a result, BNNTs can be grown unanchored to a substrate. Boron, nitrogen and catalyst source compounds can be sublimed or dispersed into a gas and flowed through one of at least two heated tubes that rotate around a common axis that is parallel to the axis of the heated tubes. In some embodiments, the heating can be by radiation from rotating or non-rotating heaters. This differs from known techniques where heating is typically by conduction, and the feed tubes do not rotate. The boron and nitrogen can react in the presence of a catalyst to form BNNTs. As the BNNTs exit the rotating tubes, multiple nanotubes from each of the different tubes are joined together to first form bundles due to Van der Waals attraction, which in turn form a network, all within the gas phase. The mass of tubes is then twisted into yarns as a result of the rotation of the reaction tubes and carried down the furnace with the gas flow where the yarn can eventually be wound up on a bobbin. This is in contrast to techniques used to produce CNTs, for instance, wherein multiple strands of nanotubes are taken from a forest and twisted just as they leave the furnace, or even twisted externally, to form a 'spun' yarn. Using the methods and apparatuses described herein, the twist (pitch) angle of the yarn can be controlled, for example, by varying the speed of rotation of the tubes, the rate of nanotube production (gas flow), or both. The resulting yarn can be collected on a spool or bobbin that receives the yarn soon after the yarn exits the furnace. This continuous process can provide indefinitely long lengths of BNNT yarn and includes individual BNNTs having lengths of greater than 10 microns to over one millimeter, one centimeter or even several meters long.

While some embodiments may introduce boron, nitrogen, and particulate catalyst into the process via a nebulizer, many embodiments use a heated sublimer to sublimate solid precursor compounds into the vapor phase. As used herein, a sublimer is a device that uses high temperature or reduced pressure, or both, to change a substance from the solid state to the gaseous state. Although in some embodiments a sublimer is limited to subliming solids, a sublimer can also serve to vaporize a liquid, such as a liquid catalyst precursor. The system may include a plurality of sublimers, for instance three or more, and separate sublimers may be used for each of a boron source, a nitrogen source and a catalyst source. One or more sublimers may be replaced by a nebulizer or other means for vaporizing precursor materials. A sublimer may include a port for receiving a carrier gas and may be heated, for example, by electrical resistance coils that encircle the sublimer, or a portion of the sublimer.

Boron precursors are substances that contain boron and can serve as a source of elemental boron for forming boron nitride. Boron precursors may be organic or inorganic and to facilitate entry into the gaseous phase they may have a sublimation point or boiling point at less than 400° C., less than 350° C., less than 300° C. or less than 100° C. at either atmospheric pressure or at the operating pressure of the sublimer, which may be greater than or less than one atmosphere. Non-limiting examples of boron precursors include h-BN, B, $YB_6$, $ZeB_2$, c-BN, $B_2H_6$, $BH_2NH_3$, BN, $B_2O_2$, $B_2P_3$, $NaBH_4$, $H_3BO_3$, $BNH_6$, $(CH_3)_2NH \cdot BH_3$, $B_3N_3H_6$ and $B_{10}H_{14}$.

In some embodiments, the boron precursor may be one or more compounds or complexes that are devoid of carbon so that no additional carbon is introduced into the product. These precursors include, for example, ammonia boron complex ($H_3BNH_3$), Borozine $(BH)_3(NH)_3$, boric acid ($H_3BO_3$), sodium borohydride ($NaBH_4$) and dimethylamine borane (($CH_3)_2NH \cdot BH_3$). These precursors can be dissolved in a solvent, such as an alcohol or glycol. A variety of solvents can be employed and can be chosen based on their ability to solubilize the precursors and to exhibit limited or no reactivity in the reactor. Solvents may be polar or non-polar, however boron and/or nitrogen precursors tend to exhibit better solubility with polar solvent than with non-polar solvents. For example, water and methanol can each dissolve the ammonia-borane complex at greater than 20% wt/wt. In contrast, ammonia-borane solubility in hexane, benzene and methylene chloride is less than 0.1% and in ethyl ether is less than 1% wt/wt. Greater solubility means that greater amounts of precursor can be introduced to the reactor with smaller amounts of solvent. In some embodiments, solvents are selected that can solubilize greater than 1% wt/wt of ammonia-borane complex and in other embodiments solvents are selected that can solubilize greater than 10% wt/wt of ammonia-borane complex. Specific embodiments of solvents may include, for example, methanol or ethanol. In some specific examples, a precursor can be dissolved in a solvent such as methanol, butanol, or ethanol at a concentration of greater than 1 g/L, greater than 5 g/L, greater than or equal to 10 g/L or greater than or equal to 100 g/L. The precursor solution can be sprayed, for example, through a nebulizer, into the reaction chamber where it reacts with a catalyst at a reactive temperature, for example, in the range of 1000 to 1500° C. In some embodiments, the same solvent can be used for a boron precursor, a nitrogen precursor, a catalyst, a reducing agent and/or a catalyst precursor.

Nitrogen precursors are molecules containing nitrogen and can serve as a source of elemental nitrogen for forming boron nitride. Nitrogen precursors may be organic or inorganic and to facilitate entry into the gaseous phase they may have a sublimation or boiling point at less than 400° C., less than 350° C., less than 300° C., less than 250° C. or less than 100° C. at either atmospheric pressure or at the operating pressure of the sublimer, which may be greater than or less than one atmosphere. In some cases, a single compound can provide both boron and nitrogen atoms. Non-limiting examples of nitrogen precursors include h-BN, $N_2$, h-BN, c-BN, $NH_3$, $BH_3NH_2$, $N_2$, $BNH_6$, $NH_4Cl$, and urea. Compounds or complexes that include both nitrogen and boron atoms may serve as a source of both boron and nitrogen for producing BNNT's. For example, in some embodiments these compounds and complexes that can provide both boron and nitrogen can be selected from h-BN, c-BN, $BH_2NH_3$, BN, $BNH_6$, dimethylamine borane (($CH_3)_2NH \cdot BH_3$), the boron ammoniate complex ($H_3BNH_3$), or borozine $(BH)_3(NH)_3$.

One, two or more different catalyst precursors may be used in a single process. A catalyst can be formed from a precursor in situ or can be formed prior to introducing the catalyst to the reaction tubes. A catalyst or catalyst precursor may be a gas, may be dissolved in a gas or may be suspended in a gas. The catalyst may be non-stationary and can flow with a carrier gas. Catalyst precursors are compounds that can be pyrolized or otherwise converted to an active catalyst. The conversion can take place externally to the system or under conditions inside the reaction tubes of the system. The catalyst precursors may have a sublimation or boiling point at less than 400° C., less than 350° C., less than 300° C. or less than 100° C. at either atmospheric pressure or at the operating pressure of the sublimer, which may be greater than or less than one atmosphere. Catalyst precursors may contain metal atoms and the precursors can be either organic or inorganic. Organo-metallic catalyst precursors include both aromatic and aliphatic compounds. The metal atoms may be transition metals and can include, for example iron, cobalt or nickel. In some embodiments, the metals can be alloys. Metal containing compounds include, for example, organo-metallic compounds such as metallocenes. Specific embodiments may include iron penta-carbonyl or ferrocene. Catalysts may be alloyed with copper or other transition metals, or with ceramics, which may help to increase catalyst stability. In another set of embodiments, a catalyst aid precursor may be included and can contain one or more sulfur atoms. The sulfur containing catalyst aid precursor can be organic and may be aromatic or aliphatic. The one or more sulfur atoms may be bound to a carbon atom and may be substituted for a carbon in a ring structure. These heterocyclic compounds can include, for example, thiophene. Additional sulfur sources include carbon disulfide and pure sulfur. In some embodiments, two or more catalyst precursors or catalyst aid precursors are used. An organo-metallic compound such as iron penta-carbonyl can be used in combination with a heterocyclic sulfur source such as thiophene. Catalyst stability can be also be enhanced by additions of other transistion metals such as copper, nickel and cobalt.

In one set of embodiments, the formation of a catalyst occurs outside the reactor. This can allow, for example, for the introduction of a catalyst into the system without the introduction of the carbon that is typically present in many catalyst precursors. These externally produced catalysts include metals and may include two or more metals such as iron, copper, cobalt and/or nickel. The catalyst may be in the form of metallic clusters or metallic alloy clusters that are formed in a solvent. In one embodiment, a nebulized spray of an solution of iron, copper, cobalt and nickel is introduced to a reducing agent that may be cooled below room temperature, for example, to 0° C.+/−5° C. The solution of metal(s) may be a solution of metallic salts at a concentration of, for example, from 0.1 to 10 g/L. The metals may be dissolved in the solution in the same ratio at which they are desired in the formed catalyst. The solvent may be polar and may include for example, water, alcohols and mixtures thereof. The solvent can be pH adjusted. The reducing agent can be a compound having a reduction potential sufficient to transfer an electron to an iron, copper, cobalt or nickel cation in order to reduce the cation to its elemental, or metallic, form. Suitable reducing agents include, for example, sodium borohydride, dimethylamine borane, hydrazine or sodium hypophosphate. The reducing agent can be dissolved in a solvent, typically a polar solvent such as an alcohol (e.g., methanol or ethanol) or water. The resulting catalyst particles may be substantially devoid of carbon. The particles may have an average diameter of less than 1 micron, less than 100 nm or less than 10 nm. In some embodiments, the average particle diameter may be in the range of, for example, 0.1 to 20 nm, 0.5 to 15 nm or 1.0 to 10 nm. One particular alloy catalyst includes iron and copper with the copper content accounting for between 5 and 10%, e.g., 7%, by weight of the alloy. The system in which the reduction of the metals takes place may include additional materials such as iron complexing agents and surfactants. Iron complexing agents include acetic acid and citrate, and the complexing agents may be present, for example, in concentrations of greater than 0.1, greater than 10, greater than 20 or greater than 50 g/L. Copper has been shown to help limit the growth of the metallic alloy particles. Surfactants may be ionic or nonionic. In one embodiment, an anionic surfactant (QC1144 from Sigma-Aldrich) is used at a concentration in the solvent of 0.1 to 10 mL/L.

In one set of embodiments a carrier gas is provided. The carrier gas may be a pure gas or may be a mixture of gases. The carrier gas can be used to flow reactants and catalysts through the apparatus, including the rotating tubes. Carrier gases can be inert gases such as helium or argon and should not interfere with pyrolysis or chemical vapor deposition. Active gasses such as nitrogen may also be used as a carrier gas. In many embodiments the carrier gases are void of water and oxygen and or may provide a reducing atmosphere. Appropriate gases include, for example, hydrogen, helium and/or argon. Gases may be provided at a variety of pressures and rates of flow. Carrier gases may include reactants or catalyst precursors or even sources of other elements such as carbon, lithium, potassium and the like. Catalysts or reactants may be bled into a carrier gas upstream of the reaction zone. For example, ammonia can be added to a carrier gas in order to provide a nitrogen source. Similarly, $B_2H_6$ or $BCl_3$ can be added to a carrier gas to provide a source of boron. Boric acid and $H_2BO_3$ are two examples of boron containing compounds that can be sublimed directly or dissolved in certain polar solvents and carried though the reaction tubes.

Apparatus—

Figure 2:
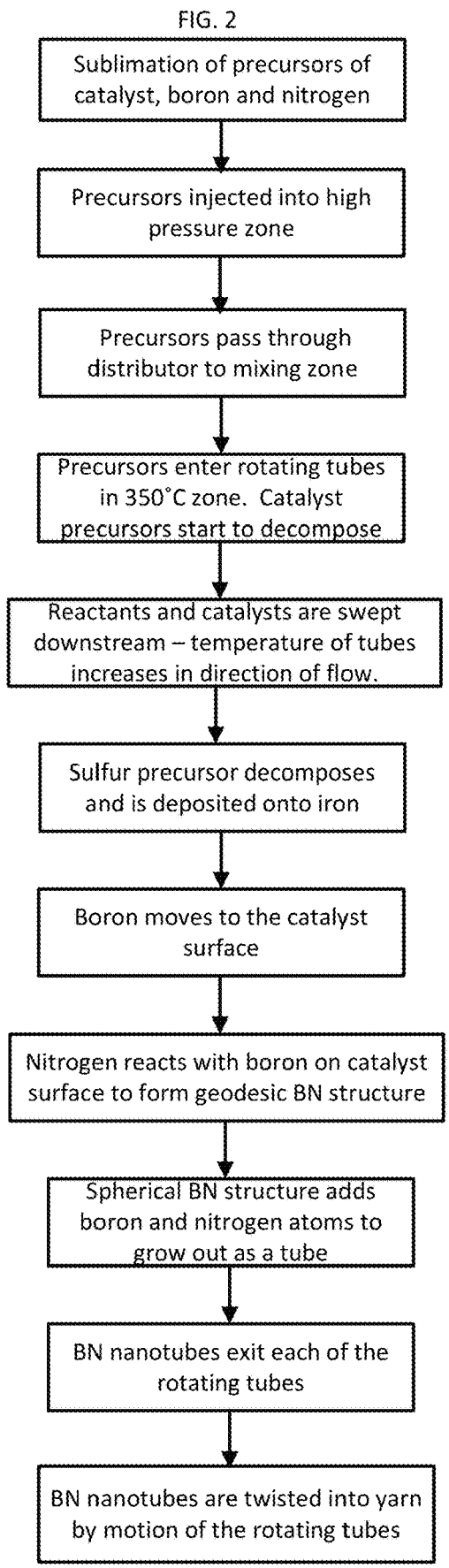
FIG. 2 provides a flow chart of one embodiment of a method for producing boron nitride nanotubes.

One embodiment of an apparatus (furnace) for producing boron nitride yarns is illustrated in FIGS. 1A and 1B. Apparatus 100 is shown in longitudinal cross section in FIG. 1A and in axial cross section in FIG. 1B. FIG. 2 provides a flow chart illustrating one embodiment of a process that can be implemented using the apparatus of FIGS. 1A and 1B.

Boron nitride nanotubes and yarns can be made on a continuous basis and materials can pass through apparatus 100 in a left to right direction as shown in FIG. 1A. In this embodiment, the apparatus includes three sublimers 110, two of which are illustrated in the figure. First sublimer 110 (lower) is shown in cutaway and second sublimer 110 (upper) is shown in a plan view. Sublimer 110 includes a sublimation chamber 108 as well as electric coil heaters 112 and orifice 114. Sublimer 110 includes valving (not shown) for receiving a controllable supply of a carrier gas, usually controlled by a rotameter or mass flow controller. The carrier gas can sweep vapor-phase or suspended, aerosol reactants and catalyst precursors through chamber 108 and through opening 114 into pressure distribution chamber 120. Distributor plate 124 can contain multiple orifices or pores and allows gaseous and, in some embodiments, suspended material to pass through into mixing zone 128. Distributor plate 124 can include adjustable orifices and the rate of passage of materials as well as the pressure differential between chamber 120 and mixing zone 128 can be controlled by using different distributor plates or via adjustments to distributor plate 124. It should be noted that the sublimers can be replaced by spray type injectors or nebulizers.

Figure 4C:
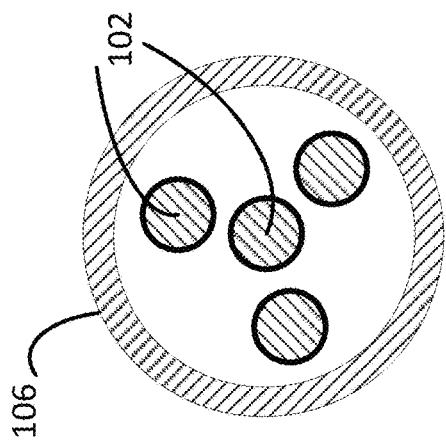
FIGS. 4A-C are schematic cross-section drawings showing alternative arrangements of rotating tubes.
Figure 4B:
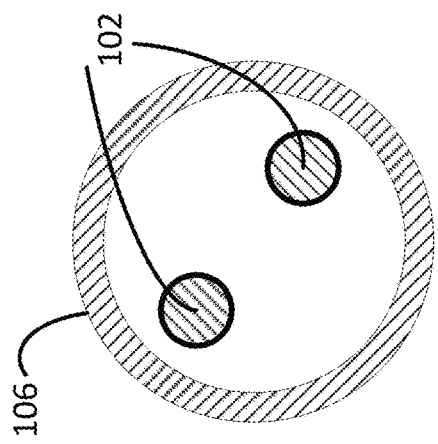
Figure 4A:
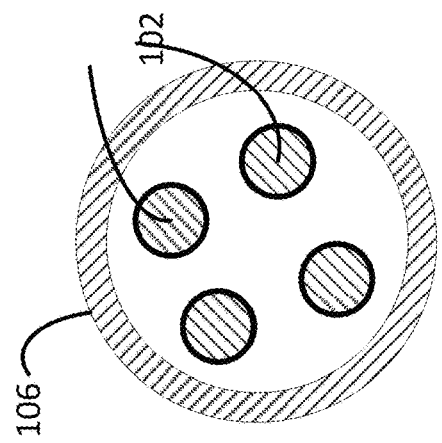

In the embodiment illustrated in FIGS. 1A and 1B, the components previously mentioned, sublimators 110 through mixing zone 128 are stationary and need not rotate. After passing into mixing zone 128, however, the precursors (catalyst, boron and nitrogen precursors, which may be gaseous) enter rotating tube(s) 102 via orifice 132. Rotating assembly 116 includes rotating tubes 102, insulation 144, insulation cap 140, rotating seal 136 and brackets 148. Additional embodiments of rotating tube configurations are provided in FIGS. 4A-4C. In the embodiment illustrated in FIG. 1B, three rotating tubes 102 are comprised of materials that are inert and temperature resistant. They can be made of materials that do not readily adsorb or react with metals, sulfur or boron at high temperatures. For example, the tubes can be a refractory material such as a ceramic. A specific example is mullite which exhibits high temperature shock resistance. Other materials include high temperature inert metallic alloys such as iron-chromium-aluminum, Inconel, or the like. In some cases, rotating tubes 102 are made from mullite. The tubes can be held in place by rotating seal 136 as well as by end cap insulation 140. The tubes may be surrounded by cylindrical thermal insulating layer 144 which can help to retain high temperatures within rotating reaction tubes 102. In different embodiments, the apparatus may include two, three, four, five, six or more rotating tubes. The rotating tubes may be equally spaced apart and may be subjected to equivalent temperature gradients during the production process. They may be of equal lengths and diameters. The diameter of each rotating tube may be constant or varied along its length. Diameters may vary depending on the output of the system. In some embodiments, the tubes have an internal diameter of less than two centimeters and may be, for example, about 10 mm. In other embodiments, tube diameter can be greater than 1 cm or greater than 5 cm. The length of the tubes is also variable and may be, for example, greater than or equal to 10 cm, greater than or equal to 20 cm or greater than or equal to 50 cm. The aspect ratio of the tubes (length to inner diameter) can be, for example, greater than 10:1, greater than 20:1 or greater than 50:1. In one set of embodiments, a tube may be positioned on the axis of rotation so that it rotates, but only about its own axis. In this manner, single, unwrapped strands of BNNTs can form a substantially straight core around which additional strands can be twisted.

Core heaters 104 are located centrally between rotating tubes 102 and, as shown, have a center of mass positioned on the axis of rotation of the tubes. The system can include one, two, three or more heaters, and each of the heaters may include different heat zones so that different tube temperatures can be maintained along the length of the rotating tubes 102. There also may be a different number of core heaters in different zones. For instance, the hottest zone can have three heaters, the mid temperature-zone may have two heaters and the coolest zone may have one heater. In some embodiments the mid-temperature zone may be hotter than the coolest zone by about 100° C., 200° C., 300° C., 400° C. or 500° C. In additional embodiments the high temperature (hottest) zone may be hotter than the mid-temperature zone by about 100° C., 200° C., 300° C., 400° C. or 500° C. The tubes may be heated using methods known to those of skill in the art such as electrical resistance, infrared and RF induced heating. Core heaters 104, as shown, are resistively heated and in turn heat the rotating tubes by radiation. Apparatus 100 may be constructed so that core heaters 104 either rotate with the rotating tubes or remain stationary. As shown in the figure, the core heaters are stationary and the rotating tubes 102 rotate around the core heaters 104. Tapes, rather than yarns, can be fabricated by not rotating the three or more tube assembly can gathering the product on a take up bobbin as a tape.

Insulation layer 144 and insulation end cap 140 are designed to retain heat within the rotating reaction tubes. They may be made of materials known those of skill in the art, such as glass, zirconia, alumina, other ceramics or even an aerogel. The inner surfaces of the insulation may include infrared reflective material such as metal foil. In some embodiments, additional heaters can also be deployed on the surface of the insulation layer to provide heat to the rotating tubes from a different angle. The insulation layer may be stationary or may rotate with the rotating tubes, and in the embodiment shown, the insulation rotates with the tubes and should be rotationally balanced.

Rotating assembly 116 is rotatably supported at each end by brackets 148 that spin on rotational bearings 152. These bearings 'bear' on a precision ground steel housing which encases the mullite reaction chamber. Rotational bearings 152 can be, for example, high temperature bearings or sealed ceramic bearings, and are positioned at left and right ends of the furnace and supported by support structure 156 which can be positioned on a surface such as a floor or lab bench, depending on the scale of the apparatus. The rotating assembly can be driven by electric synchronous or stepping motor 160 in combination with drive belt 164 which circles right side bracket 148 as well as motor drive shaft 162. In alternative embodiments, the rotating assembly can be driven using gears or chains and sprockets, for example. The rotating assembly can be spun either clockwise or counter-clockwise at constant or varying speeds. For example, the rotating tube assembly can be rotated at infinitely adjustable speeds including 2, 5, 10, 15, 30 rpm or more, depending on the speed of BNNT production as well as the desired pitch angle of the BNNT yarn. The motor may be controlled by a microcontroller that can be in communication with a microprocessor such as a computer or a special purpose process controller. The computer can transmit controls from an operator to the motor and in some embodiments may respond directly to changes in production such as changes in rate or quality of BNNT production or in the pitch angle, or tension of the yarn. Yarn tension control can be measured and controlled, for example, using the commonly used textile 'Dancer" whose position is an indication of fiber tension.

As rotating assembly 116 contains pressurized gas and must interface with non-rotating portions of the apparatus, gastight seals are provided to seal gases in the rotating tubes and the rotating assembly 116. Any seal should be able to retain its integrity under the heat, pressure and rotational movement that is generated during the production process. Seals can be designed so that they are substantially gastight when the system is at operating temperature. Any leakage can be vented. Graphite thermal reflectors 168 can completely surround the rotating assembly and help keep the outer supports cool by reflecting heat back into the furnace.

Apparatus 100 can also include large diameter refractory tube 172 that can be stationary and surrounds rotating assembly 116 at the right end of the apparatus as shown. Refractory tube 172 may be made of mullite and may include additional heater(s) 176 which heat from the outside of rotating tubes 102. Large diameter refractory tube 172 may be 2×, 3×, 5× or more than 10× the diameter of rotating tubes 102. For example, as shown, large diameter tube 172 is about 7.5 cm in diameter. With this configuration, rotating tubes 102 can be heated internally from a central axis in one location and externally, if required, in a second location. Refractory tube 172 may extend beyond the end of the rotating tubes by a distance greater than or equal to 0.25, 0.5 or 1.0 times the length of the rotating tubes. Refractory tube 172 and heater 176 can be insulated to direct, reflect and retain heat inwardly toward rotating tubes 102 and toward gasses and BNNTs that are exiting the rotating tubes.

Apparatus 100 can be associated with a spool or bobbin (not shown) or other receiving device to gather BNNT yarn as it is produced. A spool or other device may rotate to accept the yarn, but it does not need to spin axially in relation to the production furnace in order to produce twisted yarns. The receiving device may be controlled by a microprocessor or operator so that its speed can be altered in response to changing conditions in the apparatus, such as an increase or decrease in production rate. The pitch of the yarn twist may be controlled, at least partially, based on the gas flows and rotational speed. A tensioning device can be placed between the spool and the furnace to measure and control yarn tension by varying velocity of a take up bobbin. The tensioning device can be in communication with a microcontroller that can adjust production parameters such as temperatures, flow rates and rotation rate in response to changes in tension. The bobbin can oscillate from side to side so that the yarn is wound up, and the winding may not necessarily be uniform. The receiving assembly, including the bobbin, bobbin translator, bobbin rotator and tension control system can all be enclosed so that no reaction gas can leak. Exhaust gasses are caused to exit though an air trap such as a water or oil container then caused to pass through a HEPA filter before existing via an exhaust duct. Both yarns and tapes should be tension controlled.

Process—

One embodiment of a method of making BNNTs is illustrated in the flow chart of FIG. 2 in conjunction with the apparatus shown in FIGS. 1A, 1B and 3. In a first part of the process, iron penta-carbonyl, thiophene and a boron source are all heated to their sublimation or boiling points in separate sublimers 110. In the embodiment shown, a carrier gas such as Ar is fed to each sublimer after a metered amount of ammonia has been added to the carrier gas. Alternatively, ammonia can be bled into the system downstream of the sublimers. The amount of boron precursor and nitrogen precursor that are added to the system can be the same or about the same on an equivalents basis. For example the ratio of nitrogen precursor to boron precursor may be 0.5:1, 1:1, or 2:1 on an equivalents basis. Iron penta-carbonyl and thiophene can be supplied on about a 1:1 molar (Fe to S) basis, although adjustments may be made in these ratios to favor specific types of BNNT growth. Amounts of catalyst and boron or nitrogen precursor can be controlled in a number of ways, including regulating the temperature of the sublimer, individually controlling the flow rate of carrier gas to each sublimer and by altering the permeability of diffuser plate 124.

The precursors can be partially mixed in high pressure chamber 120 and then pass through distributor plate 124 into mixing zone 128 where the precursor materials are dispersed in the carrier gas. Carrier gas, that includes iron penta-carbonyl, thiophene, ammonia and $BCl_3$, enters into rotating tubes 102 at entrance orifice 132. The advancement of the reactants through rotating tubes 102 is most easily followed by referring to FIG. 3. In the embodiment shown, gas flows through the tube at a linear velocity of about 1 to about 10 cm/sec. As the precursor materials enter zone A of rotating tube 102, which is rotating axially about a central axis at a rate of about 5 rpm, the materials are subjected to a temperature of about 300° C. At this temperature, iron penta-carbonyl starts to decompose and free Fe will react with additional Fe. The gaseous mixture flows into zone B where the temperature has increased to about 850° C. At this temperature, thiophene decomposes and sulfur atoms are deposited onto the iron that is now available. This S—Fe material becomes a floating catalyst capable of adsorbing boron. As the flow advances to zone C, it is subjected to an even higher temperature of about 1000° C. At this temperature the ammonia and boron trichloride decompose at an appreciable rate, and elemental boron and nitrogen become available. The boron adsorbs on the surface of the catalyst and available nitrogen reacts to form covalent bonds with the boron to form BN. The BN first grows in a structure likely resembling a geodesic shape and as growth continues, the geodesic shape starts to elongate and grow out as single walled BNNTs. By the time the carrier gas exits rotating tube 102 at outlet 182, the majority of the BNNTs have been grown and can be collected. The BNNTs exiting the different rotating tubes can be drawn together in a bunch and by holding the bunch stationary the tubes are twisted into a yarn due to the constant rotation of the rotating tubes 102 around a longitudinal axis. The pitch of the twist can be adjusted by, for example, changing the speed of rotation of the reaction tubes or the rate at which the nanotubes are collected and/or produced. The pitch may be selected to be, for example, between 5 and 50 degrees, between 10 and 30 degrees or between 10 and 20 degrees. By forming BNNTs in the rotating tubes instead of twisting using a rotating anchor, for instance, the nanotubes are much easier to align for yarn formation. There is no intermediate "collection" step between when the BNNTs are formed and when they are spun into yarns. In an additional embodiment, untwisted nanotube cores can be obtained from a single tube that is centrally located axially and is therefore axially aligned with the yarn that is formed. In this manner, two, three or more strands of nanotubes could be twisted about a single, untwisted core of BNNTs, all in a single process.

Figure 5:
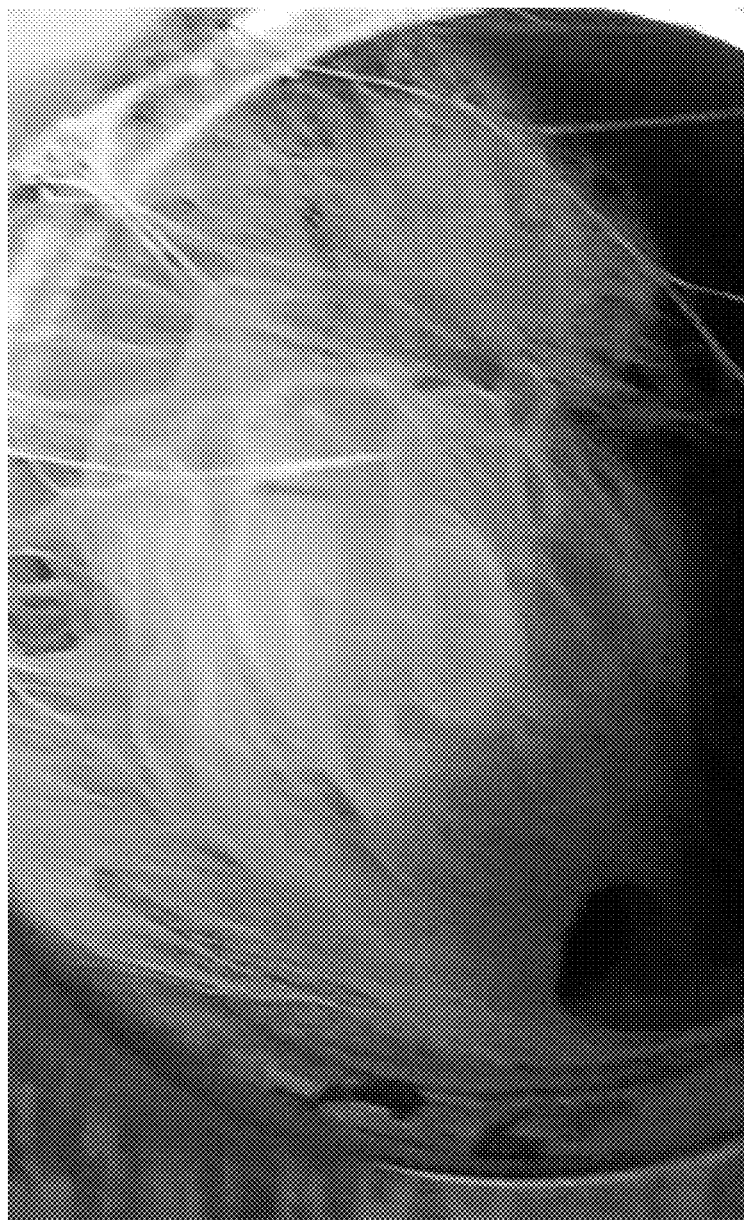
FIG. 5 is a photocopy of a photograph showing one embodiment of boron nitride nanotube yarns decorating the end of a reaction furnace tube.

In one example, the catalyst was formed outside of the reactor and at a temperature of less than 10° C. An iron copper alloy catalyst was made by nebulizing an aqueous solution of iron (III) chloride and copper (II) chloride into a 3 to 10% solution of sodium borohydride in methanol at 0° C. By mass, the ratio of iron to copper was 93:7 and the ratio of metal precursor solution to sodium borohydride solution was less than 0.2%. The sodium borohydride solution contained 20 g/L of acetic acid and about 1 mL/L of QC1144 anionic surfactant. The resulting metallic alloy particles containing 7% copper by weight were less than 30 nm in diameter when measured using high resolution SEM or TEM. The resulting dispersion of metallic alloy particles in methanol was injected into the reactor along with a 3 g/L methanolic solution of ammonia borane complex. The ratio of catalyst to ammonia borane was about 2%. The reactor was held at 1450° C. with an overall flow rate of 3 standard liters per minute. The resulting BNNTs are shown decorating the end of the reaction tube in the photograph reproduced in FIG. 5.

Due to the continuous nature of the processes described herein, nanotubes of extremely long length and aspect ratio can be formed. Individual BNNTs having diameters of 2, 5, 10 or 50 nanometers may have lengths of greater than 10 microns, greater than 100 microns, greater than 1 mm or even greater than 1 cm. These nanotubes can have aspect ratios of greater than 100,000:1, greater than 1,000,000:1 or greater than 10,000,000:1. As a result, continuous yarns can be spun having lengths greater than 10 cm, greater than 20 cm, greater than 1 m, greater than 10 m or greater than 100 m. Thicknesses of yarns may vary and can be from a few microns up to several millimeters.

Production rates may be extremely high, and in one embodiment BNNTs may be produced at a rate of about 1 to 10 g/tube per hour or about 3 to 30 g/hr or more for an apparatus with three rotating tubes. Additional materials may be added to the BNNTs. For example, dopants can be bled into the carrier gas to be deposited in the BN matrix as the BNNTs are formed. Dopants may include, for example carbon, which can be provided from a source such as ethanol, butanol, acetone, carbon monoxide, toluene, methyl formate, methane, hexane or other carbon containing substance.

Tension control during yarn formation can be achieved using commercial textile yarn tension control apparatus consisting of a tension measuring system and a feed back loop controlling bobbin rotation rate.

The BNNTs described herein can be used in a variety of applications and devices. For example, they can be used as electrical insulators and in piezoelectric devices. BNNTs can be used in armor applications, including body armor, vehicle armor and aerospace armor. Additional uses are found in composites such as ceramic/BNNT composites and BN/BNNT composites.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified, unless clearly indicated to the contrary.

All references, patents and patent applications and publications that are cited or referred to in this application are incorporated in their entirety herein by reference.

What is claimed is:

1. A method of producing boron-nitride nanotube continuous yarn, the method comprising:
feeding a boron containing gas species and a nitrogen containing gas species, the nitrogen containing gas species and the boron containing gas species being the same or different, a carrier gas, and a catalyst or a catalyst precursor into a plurality of reaction tubes, each reaction tube having a first portion at a first temperature and a second portion at a second temperature greater than the first temperature;
rotating the reaction tubes around a common axis while the boron, nitrogen and catalyst flow from the first portion to the second portion of each of the plurality of reaction tubes;
growing boron-nitride nanotubes towards an end of each of the plurality of reaction tubes; and
combining the boron-nitride nanotubes into a yarn as the nanotubes exit the reaction tubes.

2. The method of claim 1 further comprising growing boron nitride nanotubes in a furnace reactor downstream of the end of the rotating reaction tubes.

3. The method of claim 1 wherein the boron containing gas species and the nitrogen containing gas species are within the same compound or complex.

4. The method of claim 1 wherein the boron containing gas species and the nitrogen containing gas species are different compounds or species.

5. The method of claim 1 wherein the nitrogen containing gas species is selected from pure nitrogen, ammonia, $BH_2NH_3$, $NaNH_4$ and $NH_4Cl$.

6. The method of claim 1 wherein the boron containing gas species is selected from $B_2H_6$, $BH_2NH_3$, BN, $B_2O_2$, $NaNH_4$, or $H_3BO3$, $B_3N_3H_6$ and $B_{10}H_{14}$.

7. The method of claim 3 wherein the boron and nitrogen containing gas species is selected from at least one of h-BN, c-BN, $BH_2NH_3$, BN, $BNH_6$, dimethylamine borane (($CH_3)_2NH·BH_3$), the boron ammoniate complex ($H_3BNH_3$) and borazine $(BH)_3(NH)_3$.

8. The method of claim 1 wherein a catalyst precursor comprises an organo-metallic compound, a sulfur containing organic compound, or both.

9. The method of claim 1 wherein a first catalyst precursor comprises iron penta-carbonyl or ferrocene and a second catalyst precursor or a catalyst aid precursor comprises thiophene.

10. The method of claim 1 wherein the catalyst is formed inside the reaction tubes.

11. The method of claim 1 wherein the catalyst is formed outside of the reaction tubes.

12. The method of claim 11 wherein the catalyst is introduced to the reactions tubes as a particle.

13. The method of claim 11 wherein the method includes combining a catalyst precursor with a reducing agent.

14. The method of claim 13 wherein the reducing agent is selected from at least one of sodium borohydride, dimethylamine borane, hydrazine or sodium hypophosphate.

15. The method of claim 11 wherein the catalyst is essentially free of carbon.

16. The method of claim 13 wherein the catalyst precursor is combined with a reducing agent at a temperature below 25° C.

17. The method of claim 11 wherein the catalyst is a metallic particle having an average size of less than or equal to 30 nm.

18. The method of claim 1 comprising:
gathering boron nitride nanotubes exiting the reaction tubes;
holding the gathered boron nitride nanotubes together; and
allowing the reaction tubes to spin the boron nitride nanotubes into a yarn.

19. The method of claim 1 comprising adding a dopant to the carrier gas.

20. The method of claim 1 wherein at least one of the boron containing gas species, the nitrogen containing gas species and the catalyst precursor is sublimed to reach the vapor phase.

* * * * *